United States Patent

Tenconi et al.

[11] Patent Number: 5,875,106
[45] Date of Patent: Feb. 23, 1999

[54] GALVANIC DECOUPLING SUPPLY UNIT FOR AN ELECTRIC VEHICLE

[75] Inventors: Sandro Tenconi, Milan; Attilio Bobbio, Genoa; Andrea Florio, Novi Ligure, all of Italy

[73] Assignee: Finmeccanica S.p.A Azienda Ansaldo, Genoa, Italy

[21] Appl. No.: 993,906

[22] Filed: Dec. 18, 1997

[30] Foreign Application Priority Data

Dec. 19, 1996 [EP] European Pat. Off. ............... 96830637

[51] Int. Cl.[6] .................................................. H02M 3/24
[52] U.S. Cl. ............................ 363/98; 363/132; 307/26; 320/137
[58] Field of Search ................... 363/98, 132; 320/137; 307/22, 26

[56] References Cited

U.S. PATENT DOCUMENTS 4,136,382  1/1979  Ricci ....................................... 363/137
4,920,475  4/1990  Rippel ..................................... 363/132
5,291,388  3/1994  Heinrich ................................... 363/98

FOREIGN PATENT DOCUMENTS

0116925 A2   2/1984   European Pat. Off. .
4107391 A1   9/1992   Germany .
WO 93/01650  1/1993   WIPO .

Primary Examiner—Shawn Riley
Attorney, Agent, or Firm—Quarles & Brady

[57] ABSTRACT

A supply unit including a direct voltage energy source formed of a number of rechargeable batteries; an electric motor for driving the vehicle; and an electric circuit interposed between the direct voltage energy source and the electric motor. The electric circuit is reconfigurable, and provides for a first operating mode to control the alternating supply voltage of the motor, and a second operating mode, alternative to the first operating mode, and wherein the reconfigurable circuit provides for rectifying an alternating voltage to recharge the batteries.

10 Claims, 4 Drawing Sheets

GALVANIC DECOUPLING SUPPLY UNIT FOR AN ELECTRIC VEHICLE

BACKGROUND OF THE INVENTION

The present invention relates to a supply unit for an electric vehicle.

As is known, an electric vehicle comprises a number of operating units, including a direct voltage energy source (normally comprising a number of batteries), an electric motor, and a supply unit for controlling energy supply from the energy source to the electric motor on the basis of a number of control signals; as well as various auxiliary units, e.g. for generating energy locally, recharging the direct voltage energy source, supplying electric equipment on the vehicle, etc.

The various units of an electric vehicle are formed inside boxes, which are physically separate from one another and interconnected by electric power and signal cables extending between the boxes.

Such a layout of the boxes poses various problems, including:

bulk, due to the large number of boxes and the connecting lines between them;

high cost of manufacturing a large number of separate units; and electromagnetic interference, due to the presence of a large number of electric power cables.

SUMMARY OF THE INVENTION

It is an object of the present invention to improve integration of the various units of an electric vehicle, while at the same time reducing the number of units themselves. More specifically, it is an object of the present invention to provide a high degree of integration between the supply unit of an electric vehicle and the battery recharging unit, to form a single part-sharing unit for alternately supplying the electric motor and recharging the batteries.

According to the present invention, there is provided a supply unit for an electric vehicle, as claimed in claim 1.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
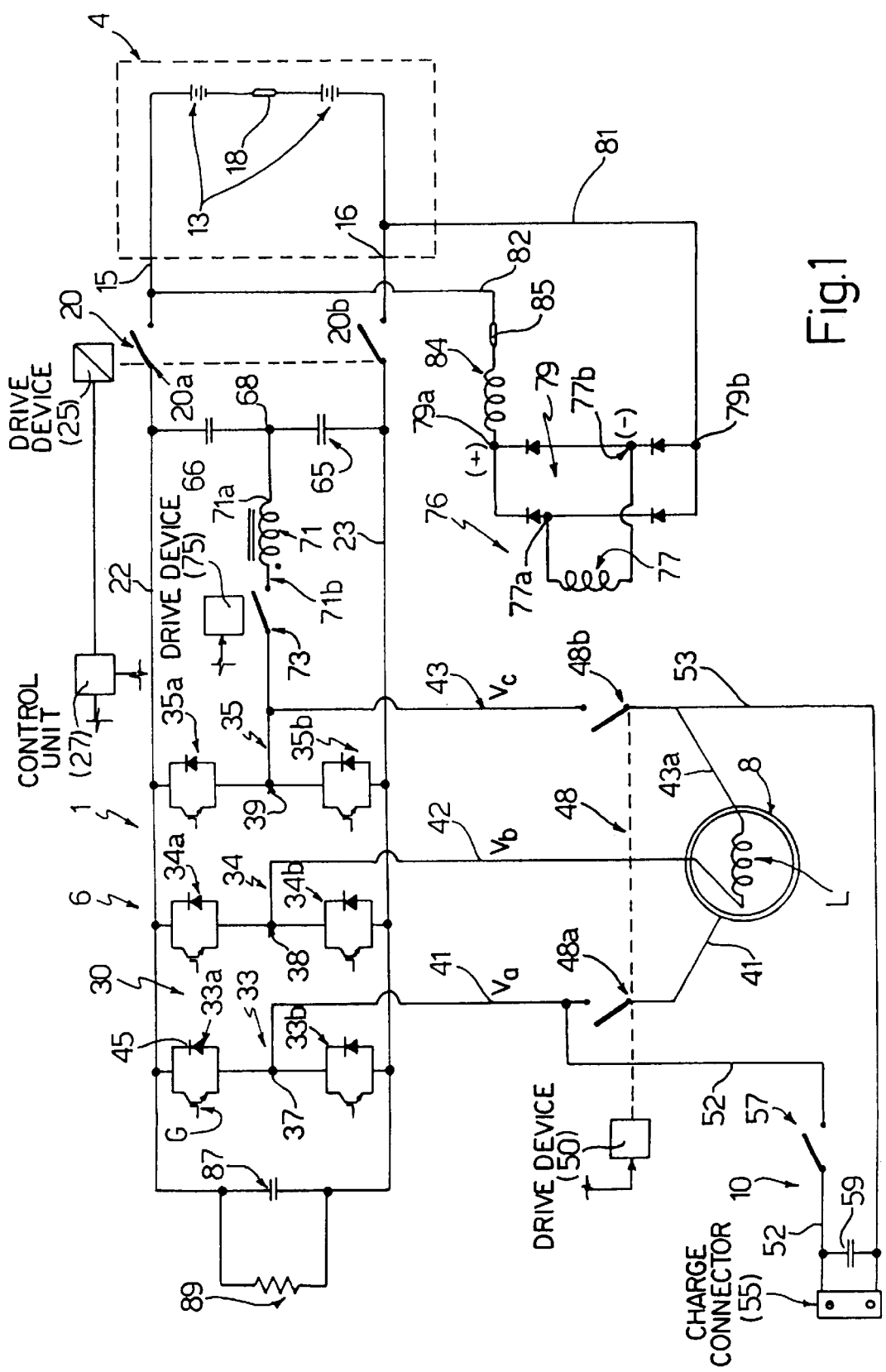
FIG. 1 shows the electric circuit of a supply unit for an electric vehicle in accordance with the teachings of the present invention.

Number 1 in FIG. 1 indicates a supply unit for an electric vehicle.

Unit 1 comprises a rechargeable direct voltage energy source 4 (shown by the dotted line) for supplying—via a reconfigurable circuit 6 operating in a first supply mode—an electric motor 8 for driving a vehicle (not shown). Unit 1 also comprises a device 10 connectable to an alternating voltage source (e.g. a 220 V, 50 Hz mains voltage) for supplying said voltage to reconfigurable circuit 6, which, when operating in a second battery-charge mode, rectifies the mains voltage to charge direct voltage energy source 4.

As used herein, the term "alternating voltage" should be understood to include "AC voltage," and the term "direct voltage" should be understood to include "DC voltage."

More specifically, energy source 4 comprises a number of rechargeable batteries 13 (in the example shown, only two are indicated for the sake of simplicity) arranged in series, and which together supply a direct supply voltage V (e.g. of 240 V) between the positive output terminal 15 and, respectively, the negative output terminal 16 of energy source 4. Direct voltage energy source 4 also comprises at least one safety fuse device 18 located in series with batteries 13, and which is disconnected when the current supply from direct voltage energy source 4 exceeds the $I^2t$ (total square current) value of the fuse.

Unit 1 also comprises a first switching assembly 20 interposed between reconfigurable circuit 6 and outputs 15, 16 of direct voltage energy source 4, and comprising a pair of switches 20a, 20b interposed respectively between positive output terminal 15 and a first line 22 of circuit 6, and between negative output terminal 16 and a second line 23 of circuit 6. Switches 20a, 20b are operated synchronously by a drive device 25 controlled by a central control unit 27 for opening/closing switching assembly 20 as described later on.

Supply lines 22, 23 terminate in a direct voltage dividing device (INVERTER) 30 comprising three pairs of electronic switches 33, 34, 35 arranged in the form of a three-phase bridge and for supplying electric motor 8. More specifically, each switch in each pair 33, 34, 35 has one terminal connected to a respective line 22, 23, and one terminal in common with a terminal of the other switch. The common terminals of pairs of switches 33, 34, 35 thus define respective nodes 37, 38, 39 from which extend respective electric lines 41, 42, 43 for supplying respective phases of electric motor 8, which, in the embodiment shown, is a three-phase motor.

Each pair of switches 33, 34, 35 comprises a "top" switch (indicated by the letter a) having a terminal connected to first electric line 22; and a "bottom" switch (indicated by the letter b) having a terminal connected to second electric line 23.

Each electronic switch may comprise a semiconductor device (in the example shown, an IGBT transistor) having a control terminal G supplied by control unit 27 for opening/closing the electronic switch; and each electronic switch also comprises a recirculating diode 45 antiparallel with the semiconductor device.

Supply lines 41 and 43 are provided with respective switches 48a, 48b forming part of a second switching assembly 48, and which are activated synchronously by a drive device 50 controlled by central control unit 27. The portion of electric line 41 extending between node 37 and switch 48a communicates with a first terminal of an electric line 52 of device 10; the portion 43a of electric line 43 extending between switch 48b and motor 8 communicates with a first terminal of an electric line 53 of device 10; electric lines 52, 53 have second terminals connected to a charge connector 55 for connecting unit 1 to the mains voltage; line 52 is also provided with a switch 57; and a capacitor 59 is interposed between lines 52 and 53.

Reconfigurable circuit 6 also comprises a first electrolytic filter capacitor 65 having a first terminal connected to line 23 and a second terminal connected to one terminal of a second electrolytic filter capacitor 66, the other terminal of which is connected to line 22. Electrolytic capacitors 65 and 66 therefore have common terminals defining a node 68 to which is connected a first terminal 71a of a winding 71 having a second terminal 71b connected to node 39 via the interposition of a third switching assembly 73. Third switching assembly 73 comprises a single switch activated by a drive device 75 controlled by control unit 27. Winding 71 forms the primary winding of a transformer 76 having a secondary winding 77, the output terminals 77a, 77b of which are connected to the input of a double-half-wave rectifier 79 (comprising a four-diode bridge) having positive and negative output terminals 79a and 79b. Terminal 79b is connected to the negative output terminal 16 of direct voltage energy source 4 over an electric line 81, and terminal 79a is connected to the positive output terminal 15 of direct voltage energy source 4 over an electric line 82 along which are provided, in series, an inductor 84 and a fuse 85.

Finally, reconfigurable circuit 6 comprises a capacitor 87 interposed between lines 22 and 23, and connected to a resistor 89 in parallel with capacitor 87.

In actual use, when first, second and third switching assemblies 20, 48 and 73 are activated in a first mode, control unit 27 provides for a first operating mode of unit 1, whereby electric motor 8 is supplied to drive the vehicle (not shown). To supply the electric motor, unit 27:

closes first switching assembly 20 (switches 20a, 20b closed);

closes second switching assembly 48 (switches 48a, 48b closed); and opens third switching assembly 73 (switch 73 open).

Switch 57 is also open, and connector 55 is not connected to any voltage source.

Figure 2:
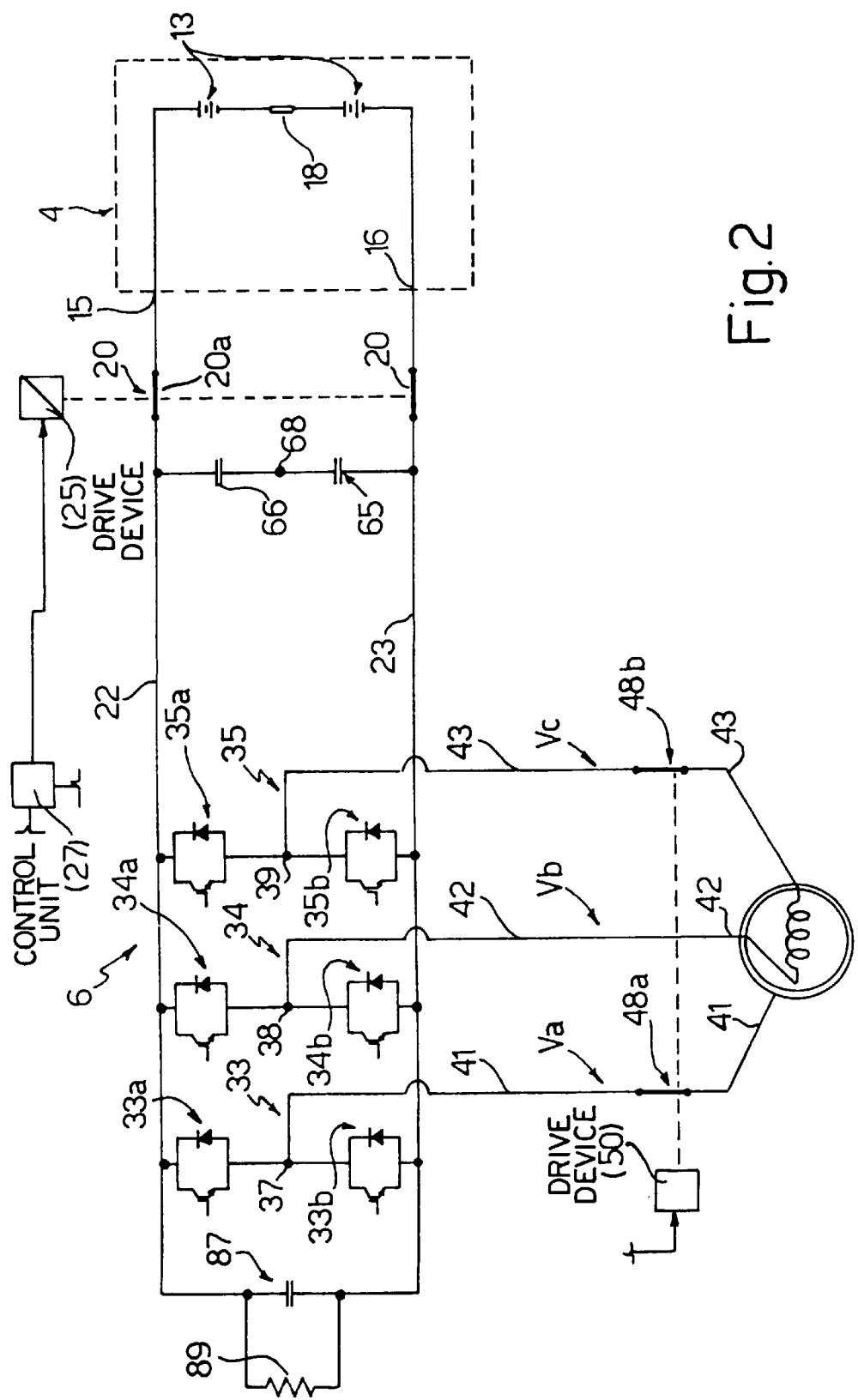
FIG. 2 shows the FIG. 1 circuit in a first operating mode.

Unit 1 therefore assumes the circuit structure shown in FIG. 2, which, for the sake of simplicity, only shows the FIG. 1 circuit components supplied with voltage or in any way involved in supplying electric motor 8.

With reference to FIG. 2, the positive and negative terminals 15, 16 of direct voltage energy source 4 are connected directly to respective lines 22, 23, so that the "top" switches 33a, 34a, 35a are supplied with a positive voltage (by line 22), and the "bottom" switches 33b, 34b, 35b are connected (by line 23) to the negative pole of direct voltage energy source 4.

Unit 27 switches all the circuit 6 switches in known manner so that electric lines 41, 42, 43 present three alternating voltages Va, Vb, Vc phase-shifted by 120° in relation to one another. Alternating voltages Va, Vb, Vc may have a constant frequency and adjustable amplitude (Pulse Width Modulation—PWM) to modify the speed of motor 8. The amplitude of alternating voltages Va, Vb, Vc is regulated as a consequence of manual adjustment of the speed and traveling direction of the electric vehicle (not shown). Capacitors 65, 66 provide for maintaining a highly constant voltage between lines 22, 23, by minimizing any fluctuation in voltage due to variations in the current drawn by motor 8 when the vehicle (not shown) is moving.

When switching assemblies 20, 48, 73 are activated accordingly, control unit 27 also provides for a second operating mode of unit 1, whereby direct voltage energy source 4 is charged. To charge the direct voltage energy source, unit 27:

opens first switching assembly 20 (switches 20a, 20b open);

opens second switching assembly 48 (switches 48a, 48b open); and closes third switching assembly 73 (switch 73 closed).

Switch 57 is also closed, and connector 55 is connected to an alternating mains voltage source R(ω) (220 V, 50 Hz).

Figure 3:
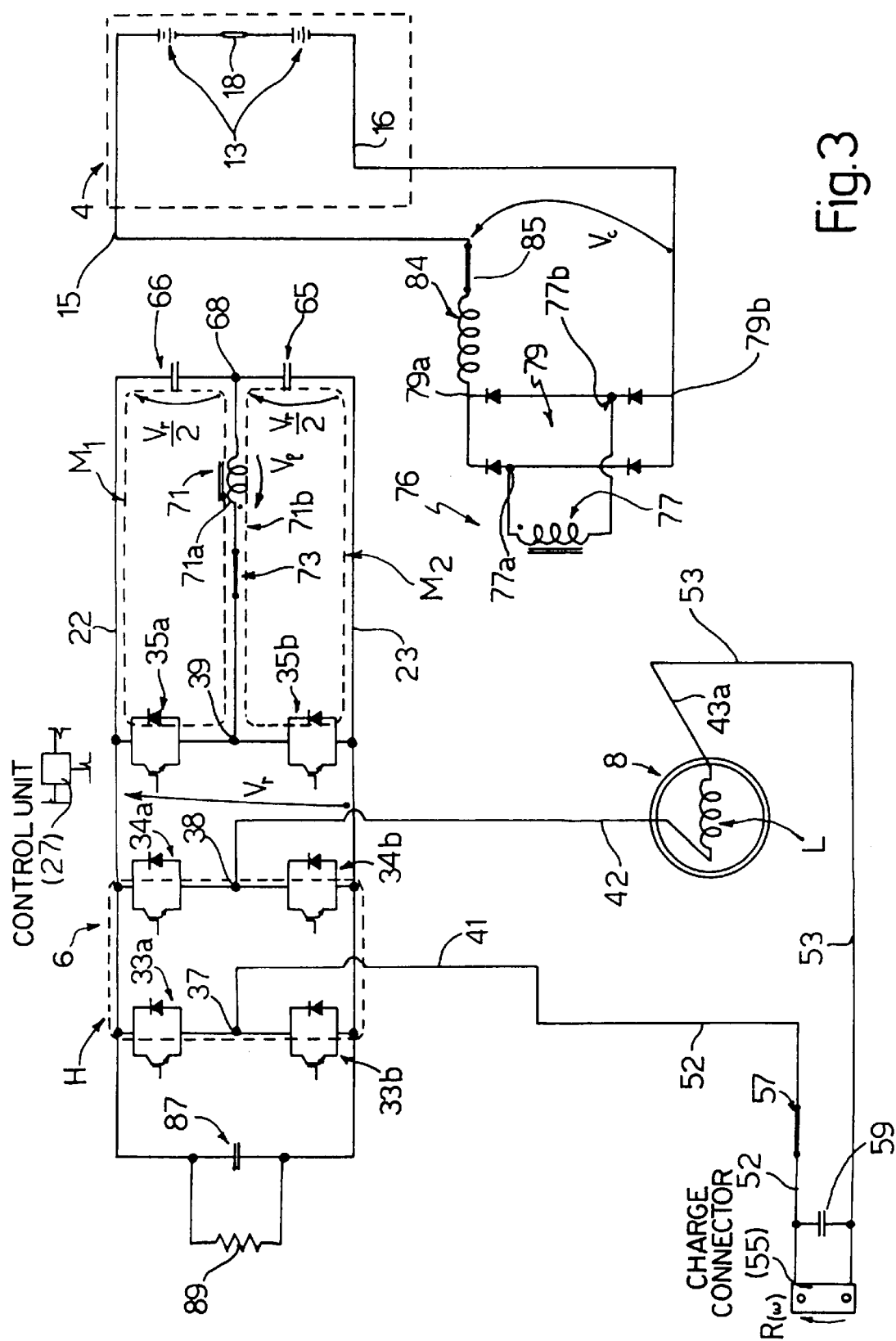
FIG. 3 shows the FIG. 1 circuit in a second operating mode.

Unit 1 therefore assumes the circuit structure shown in FIG. 3, which, for the sake of simplicity, only shows the FIG. 1 circuit components supplied with voltage or in any way involved in charging batteries 13.

The mains voltage R(ω) at connector 55 is supplied to electric lines 52, 53, which respectively communicate with electric line 41 and the portion 43a of electric line 43 extending between switch 48b (open) and electric motor 8. Portion 43a of electric line 43 also communicates with electric line 42 via an internal winding L (shown in the form of an inductor) of electric motor 8, so that the alternating mains voltage R(ω) at connector 55 is applied to nodes 37 and 38. More specifically, the mains voltage is applied, via inductor L, to nodes 37, 38 of pairs of series switches 33 and 34, which form an H active rectifying bridge (shown by the dotted line). Unit 27 therefore opens/closes switches 33a, 33b and 34a, 34b at high frequency (e.g. 20 KHz) and according to known switching techniques, so that a direct voltage Vr, produced by rectifying the mains voltage and having a small amount of ripple, is present between electric lines 22 and 23.

Alternating mains voltage R(ω) is rectified using switches 33a, 33b and 34a, 34b, which, in the supply mode described previously, are also used for supplying the electric motor. Moreover, winding L of electric motor 8 is connected between connector 55 and the H active rectifying bridge to control the current harmonics in conformance with noise reduction regulations.

Voltage Vr between lines 22, 23 is applied to capacitors 65 and 66, which, having the same capacitance, are each charged to a voltage (Vr/2) substantially equal to half of voltage Vr.

Now observe mesh $M_1$ comprising switch 35a, capacitor 66 and winding 71, and mesh $M_2$ comprising switch 35b, capacitor 65 and winding 71.

If switch 35a is closed (with switch 35b open), winding 71 is supplied with a voltage Vl according to the equation:

$$Vl = Vr - \text{node 68 voltage} = Vr - Vr/2 = Vr/2$$

Conversely, if switch 35b is closed (with switch 35a open), winding 71 is supplied with a voltage Vl according to the equation:

$$Vl = -Vr + \text{node 68 voltage} = -Vr + Vr/2 = -Vr/2$$

Consequently, when switches 35a and 35b are closed alternately (by control unit 27), winding 71 is supplied with an alternating voltage Vl oscillating between ±Vr/2. The alternating voltage ±Vr/2 supplied to the primary of transformer 76 (winding 71) is transferred to the secondary winding 77, the output voltage of which is supplied to the input of rectifying bridge 79. Rectifying bridge 79 therefore supplies a direct voltage Vc, which is supplied to terminals 15 and 16 of direct voltage energy source 4 to charge batteries 13. Switches 35a, 35b, together with capacitors 65, 66, transformer 66 and rectifying bridge 79, therefore form a direct-to-direct voltage converter for converting voltage Vr to an alternating voltage (Vl) which is supplied to a transformer and subsequently rectified. This therefore provides for static conversion, with galvanic type decoupling, of direct voltage Vr (between lines 22, 23) into a direct voltage Vc (supplied to terminals 15 and 16 of direct voltage energy source 4). Which static voltage conversion is achieved using components (switches 35a, 35b and capacitors 65, 66) which are also used for supplying electric motor 8. Only a very small number of components (transformer 76 and diode bridge 79) are used solely for static conversion; and inductor 84 also provides for regulating the charge current of batteries 13.

The advantages of the present invention will be clear from the foregoing description. Unit 1 in fact provides for a high degree of integration of the vehicle supply and battery charge units by forming a single part-sharing unit for alternately supplying the electric motor and charging the batteries.

In both the above operating modes, unit 1 in fact shares the following components:

the semiconductor switches (pairs of switches 33, 34, 35);

the drive circuits (control unit 27);

filter capacitors 65, 66; and the windings of electric motor 8.

Figure 4:
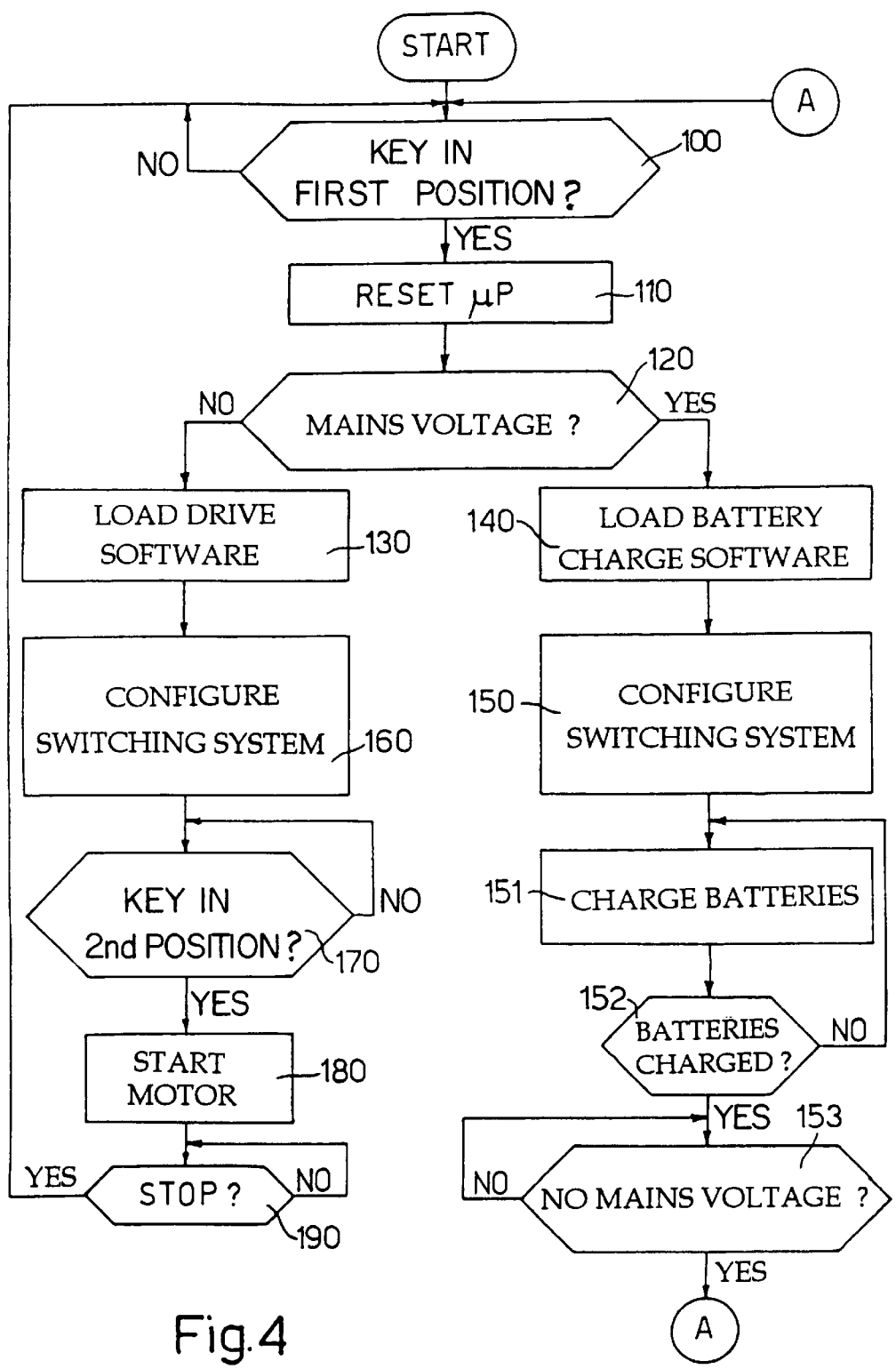
FIG. 4 shows an operating block diagram of a unit forming part of the FIG. 1 circuit.

FIG. 4 shows an operating block diagram of control unit 27. Operation commences with a standby block 100, which is exited when a given manual operation is performed, e.g. when the ignition key (not shown) of the electric vehicle (not shown) is set to a first angular position, and which is followed by a block 110 in which the main microprocessor (not shown) controlling control unit 27 is reset.

Block 110 is followed by a block 120, which determines the presence of alternating voltage at connector 55. In the event of a negative response (no voltage at connector 55), block 120 goes on to a block 130. Conversely (mains voltage at connector 55), block 120 goes on to a block 140, which loads the instructions permitting battery charge control of pairs of switches 33, 34, 35. Block 140 is followed by a block 150, which provides for opening switches 20a, 20b and 48a, 48b and closing switch 73 to form the circuit arrangement shown in FIG. 3. Block 150 also provides for switching pairs of switches 33, 34, 35 as described above for the battery charge function, and is followed by a block 151 in which the above battery charge operations are performed. Block 151 is followed by a block 152, which determines whether direct voltage energy source 4 has been fully charged. In the event of a negative response, block 152 goes back to block 151. Conversely block 152 is followed by a block 153, which determines the absence of mains voltage at connector 55. In the event of a positive response (no mains voltage), block 153 goes back to block 100; conversely (mains voltage still present), energy source 4 is supplied with a weak current to maintain the charge.

Block 130 loads the instructions permitting vehicle drive control of pairs of switches 33, 34, 35, and is followed by a block 160, which provides for closing switches 20a, 20b and 48a, 48b and opening switch 73 to form the circuit arrangement shown in FIG. 2. Block 160 is followed by a block 170, which is exited when a manual operation is performed, e.g. when the ignition key (not shown) is set to a second angular position. Block 170 is followed by a block 180, which switches pairs of switches 33, 34, 35 as described for the vehicle drive function, to supply electric motor 8 to drive the vehicle. Block 180 is followed by a block 190, which awaits a motor-off signal. Upon said signal being received, motor 8 is turned off and block 190 goes back to block 100.

Control unit 27 therefore provides for automatically charging the batteries when mains voltage is present at connector 55. Moreover, supply to electric motor 8 is disabled while charging the batteries.

Clearly, changes may be made to the supply unit as described and illustrated herein without, however, departing from the scope of the present invention.

We claim:

1. A supply unit for an electric vehicle, comprising:

a direct voltage energy source (4) comprising at least one rechargeable battery (13);

an electric motor (8) for driving said vehicle; and an electric circuit (6) interposed between outputs (15, 16) of said direct voltage energy source (4) and said electric motor (8);

wherein said electric circuit (6) is reconfigurable, and provides for a first operating mode to control the direct voltage supplied by the direct voltage energy source (4) to further control supply voltages (Va, Vb, Vc) to said electric motor (8); said reconfigurable electric circuit (6) also providing for a second operating mode alternative to said first operating mode and wherein an alternating voltage (R(ω)) is supplied to said reconfigurable circuit (6);

said reconfigurable circuit (6) including, for said second operating mode, a rectifying circuit (33a, 33b, 34a, 34b, 27) for rectifying said alternating voltage and forming at the output (79a, 79b) a rectified direct voltage (Vr) which is supplied to said battery (13) to charge (Vc) the battery, and wherein a direct voltage-to-direct voltage converter is interposable between an output of said rectifying circuit (33a, 33b, 34a, 34b, 27) and said outputs of said direct voltage energy source (4);

said direct voltage-to-direct voltage converter providing for galvanic type decoupling of said rectifying circuit and said direct voltage energy source (4), and for picking up said rectified direct voltage (Vr) to form at the output a direct charging voltage (Vc) applied to said outputs (15, 16) of said direct voltage energy source (4); and said direct voltage-to-direct voltage converter being enabled for said second operating mode, and being disabled for said first operating mode.

2. A unit as claimed in claim 1, further characterized by an electronic control unit (27) for determining the presence of said alternating voltage (R(ω)) so as to automatically enable said second operating mode and disable said first operating mode.

3. A unit as claimed in claim 1, characterized in that said direct voltage-to-direct voltage converter further comprises:

capacitors (65, 66) which are charged with said rectified direct voltage (Vr);

at least a first pair of electronic switches (35a, 35b) connectable (73) to said capacitors (65, 66), and which are switched to generate an alternating signal (V1) using the direct voltage present at the capacitors (65, 66);

a decoupling transformer (76) having a primary winding (71) to which said alternating signal (V1) is applied; and a final rectifier (79) interposed between a secondary winding (77) of said decoupling transforming means (76) and said direct voltage energy source (4).

4. A unit as claimed in claim 3, characterized in that said direct voltage-to-direct voltage converter further comprises first cutout switching means (73) settable to a first operating mode, so that said capacitors (65, 66) are disconnected from said first pair of electronic switches (35a, 35b);

said first cutout switching means (73) also being settable to a second operating position corresponding to said second operating mode, to connect said capacitors (65, 66) to said first pair of electronic switches (35a, 35b) via said primary winding (71).

5. A unit as claimed in claim 4, wherein said reconfigurable circuit comprises at least a second pair of electronic switches (33a, 33b) in series with each other and interposed between first and second said electric lines (22, 23), and a third pair of electronic switches (34a, 34b) in series with each other and interposed between said first and second lines (22, 23); the common terminals (37, 38) of said second pair of electronic switches (33a, 33b) and said third pair of electronic switches (34a, 34) defining respective nodes (37, 38) communicating with respective supply lines (41, 42) for supplying said electric motor (8);

in said first operating mode, said first and second lines communicating (20, 20b) with said direct voltage energy source, and said second pair of electronic switches (33a, 33b) and said third pair of electronic switches (34a, 34b) being activated in a first switching mode to generate said alternating supply voltage (Va, Vb, Vc) at said respective nodes (37, 38);

said reconfigurable circuit comprising first switching means (48) settable to a first position corresponding to the first operating mode, so that said supply lines (41, 42) communicate with said electric motor to supply said alternating supply voltage;

said first switching means (48) being settable to a second position corresponding to the second operating mode, so that said electric motor is at least partly disconnected from said supply lines (41, 42) and said alternating voltage is supplied to said respective nodes (37, 38); in said second operating mode, said second pair of electronic switches (33a, 33b) and said third pair of electronic switches (34a, 34b) being activated in a second switching mode, so that said rectified direct voltage (Vr) is present on said first and second lines (22, 23).

6. A unit as claimed in claim 5, characterized in that, in said second position, said first switching means (48) interpose inductor means, forming part of said electric motor, between one (38) of said nodes and a source of said alternating voltage(R((ω)).

7. A unit as claimed in claim 5, characterized in that said reconfigurable circuit also comprises said first pair of electronic switches (35a, 35b) in series with each other and interposed between said first and second lines (22, 23);

the common terminals (39, 37, 38) of said first pair of electronic switches, said second pair of electronic switches and said third pair of electronic switches defining respective first, second and third nodes (39, 37, 38) communicating with respective supply lines (43, 41, 42) for supplying a said three-phase electric motor (8);

in said first operating mode, said first pair of electronic switches (35a, 35b), said second pair of electronic switches (33a, 33b) and said third pair of electronic (34a, 34b) switches being activated in a first switching mode to generate said alternating supply voltage (Vc, Va, Vb) at said nodes (39, 37, 38);

in said first position, said first switching means (48) permitting said supply lines (41, 42) to communicate with said three-phase electric motor;

in said second position, said first switching means (48) disconnecting at least one of said supply lines (41, 42) from said electric motor (8), and said alternating voltage being supplied to two of said first, second and third nodes (37, 38, 39).

8. A unit as claimed in claim 5, wherein said direct voltage to-direct voltage converter further comprises:

said first pair of electronic switches (35a, 35b) in series with each other and interposed between said first and second line (22, 23);

first and second capacitors (65, 66) in series with each other and interposed between said first and second line (22, 23) so that each is charged with part of said rectified direct voltage (Vr) present between said first (22) and second (23) line;

said primary winding being interposed between a node (39) at which said first pair of electronic switches (35a, 35b) communicate, and a node at which said first and second capacitors (65, 66) communicate;

in said second operating mode, said first pair of electronic switches (35a, 35b) being switched alternately to generate said alternating signal (V1) applied to said primary winding (71).

9. A unit as claimed in claim 8, characterized in that said reconfigurable circuit also comprises said first pair of electronic switches (35a, 35b) in series with each other and interposed between said first and second lines (22, 23);

the common terminals (37, 38, 39) of said first pair of electronic switches, said second pair of electronic switches and said third pair of electronic switches, defining respective first, second and third nodes (39, 37, 38) communicating with respective supply lines (43, 41, 42) for supplying said electric motor (8), wherein said electric motor is a three-phase motor;

in said first operating mode, said first pair of electronic switches (35a, 35b), said second pair of electronic switches (33a, 33b) and said third pair of electronic switches (34a, 34b) switches being activated in a first switching mode to generate said alternating supply voltage (Vc, Va, Vb) at said respective nodes (39, 37, 38);

in said first position, said first switching means (48) permitting said supply lines (41, 42, 43) to communicate with said three-phase electric motor;

in said second position, said first switching means (48) disconnecting at least one of said supply lines from said electric motor, and said alternating voltage being supplied to two of said first, second and third nodes (39, 38, 37).

10. A unit as claimed in claim 5, characterized by comprising second cutout switching means (20) interposed between said outputs (15, 16) of said direct voltage energy source (4) and said first and second line (22, 23); said second cutout switching means (20) being closed in said first operating mode to permit energy flow from said direct voltage energy source (4) to said motor (8), and being open in said second operating mode to disconnect said first and second line (22, 23) from said direct voltage energy source (4).

* * * * *